US008845264B2

(12) United States Patent
Kubiak et al.

(10) Patent No.: US 8,845,264 B2
(45) Date of Patent: Sep. 30, 2014

(54) BED TRANSPORT AND UTILITY DOLLY

(75) Inventors: Craig P. Kubiak, Washington, MO (US); Michael W. Megown, St. Louis, MO (US)

(73) Assignee: NOA Medical Industries, Inc., Washington, DC (US)

( * ) Notice: Subject to any disclaimer, the term of this patent is extended or adjusted under 35 U.S.C. 154(b) by 1103 days.

(21) Appl. No.: 12/842,645

(22) Filed: Jul. 23, 2010

(65) Prior Publication Data

US 2011/0078857 A1 Apr. 7, 2011

Related U.S. Application Data

(63) Continuation-in-part of application No. 11/732,025, filed on Apr. 2, 2007, now abandoned.

(51) Int. Cl.
*B60P 1/02* (2006.01)
*A61G 7/08* (2006.01)

(52) U.S. Cl.
CPC .......................................... *A61G 7/08* (2013.01)
USPC .............. 414/495; 414/458; 5/86.1; 5/81.1 R; 5/600

(58) Field of Classification Search
USPC ................. 414/458, 495; 5/86.1, 81.1 R, 600
See application file for complete search history.

(56) References Cited

U.S. PATENT DOCUMENTS

| | | | | |
|---|---|---|---|---|
| 4,913,614 | A | 4/1990 | O'Rarden | |
| 5,088,706 | A * | 2/1992 | Jackson | 5/608 |
| 5,716,186 | A * | 2/1998 | Jensen et al. | 414/458 |
| 6,314,977 | B1 | 11/2001 | Obitts et al. | |
| 6,405,393 | B2 | 6/2002 | Megown | |

* cited by examiner

*Primary Examiner* — James Keenan
*Assistant Examiner* — Willie Berry, Jr.
(74) *Attorney, Agent, or Firm* — Kevin L. Klug

(57) ABSTRACT

A bed transport and utility dolly comprising two or more supports which removably attach at the head and the foot of an adjustable bed. The dolly provides bed transport in a taller and thinner form and allows easy movement through doorways and safe navigation of hallways. The present art apparatus and method of use utilizes the ability of an adjustable bed to substantially retract the bed support arms or legs whereby the transport and utility dolly retains the weight of the bed and allows rotation of the bed into a taller and thinner form before transport, all without the use of specialty tools or extra dollies. Each support comprises a frame with a pivotally attached swing arm having one or more bed couplers with quick release mechanisms which removably attach to the frame or other structurally supportive portion of the bed.

9 Claims, 18 Drawing Sheets

BED TRANSPORT AND UTILITY DOLLY

This application is a Continuation-in-Part of U.S. patent application Ser. No. 11/732,025, filed on Apr. 2, 2007 now abandoned.

BACKGROUND OF THE INVENTION

This invention relates to transportation mechanisms or structures for beds in general and more specifically to a removable dolly system, apparatus, and method of use which easily provides rotation or pivoting and transportation of a bed. The present art is especially useful with beds which are typically found in hospitals or nursing care facilities and commonly known in the medical and nursing care industries as adjustable height or angle beds, including those known as low or low type beds. An example of some of the art of low beds is shown and described in U.S. Pat. No. 6,405,393 issued to Megown, entitled Height and Angle Adjustable Bed Having a Rolling Base, and is hereby incorporated by reference. The present art uniquely utilizes a pair of structures having castors or rollers which quickly and easily attach or inter-fit at the head and the foot of the aforesaid beds and provide a dolly like transport without the use of extra tools, movers, or jacks. The present art further allows rotation or pivoting of the attached bed whereby the bed may easily and safely fit through doors and navigate hallways during transport.

Many adjustable beds as found within the medical and nursing care arts have supporting legs or arms which retract or fold under the bed whereby the bed may be lowered very close to the floor. Unfortunately, even when the beds have rollers on the supporting legs or arms, it is difficult to transport the beds through doorways and hallways. That is, the width of each bed is often approximately equal to or larger than the size of the doorway through which transport is desired. Within hallways, the aforesaid beds occupy considerable width which inhibits bed transport or creates a safety hazard for nearby pedestrians or patients.

The art of the present invention utilizes the characteristics of adjustable height beds to incorporate a dolly system which significantly eases transport. The present art bed transport and utility dolly connects or removably attaches with the foot and head areas of the adjustable bed when said bed is in a partially or fully raised position and upon retraction of the bed supporting legs or arms, allows the bed to pivot or rotate for easy transportation. That is, the bed pivots on an axis between the foot and head portions while held by the dolly system. When the bed deck is pivoted or rotated approximately 90 degrees from horizontal and the legs or arms are retracted, the transport width is greatly reduced. As aforesaid, the present art bed transport and utility dolly has rotatable bed attachments and base rollers or castors.

Prior art moving apparatuses such as found in U.S. Pat. No. 4,913,614 issued to O'Rarden represent conventional moving type structures which require extra or additional tools to perform object transportation. The art of O'Rarden is utilized specifically for a piano and only allows jacking and tilting of the piano, not moving. O'Rarden specifically states that another tool, i.e. a dolly, is necessary for movement of the piano. This prior art requirement of extra tools or dollies to move a bed is overcome with the present art as applied to low type beds, i.e. having raising and lowering support arms or legs. As stated, the present art in combination with the unique characteristics of a low type bed, utilizes the unique properties of a low type bed to use a single pair of supports to lift, rotate, and move the bed, i.e. as a single tool. The present art uniquely engages a tube of the low bed without jack assemblies or pads, allows retraction of the bed legs after attachment and before rotation, allows the bed to be rotated upon the present art and thereafter moved through doors and hallways. No jacks are required. Attachment, rotation, movement, re-rotation, and placement are all accomplished without any extra tools. That is, the present art uniquely engages a tube or frame of the bed. Unlike the prior art which simply allows a piano to sit upon rubber mounting pads.

The art of the present invention, in a preferred embodiment, represents a pair of supports, one for the head and one for the foot of the bed. Each support has a frame with two or more base rollers or castors, a swing arm rotatably or pivotally held with said frame via a support shaft, and one or more handles for manipulation. Bed attachments or couplers quickly and easily attach and remove from the bed for convenient transport. In operation, the user simply raises the bed to a height commensurate with the level of said bed attachments or couplers on each support, attaches or engages said bed attachments or couplers to the bed, retracts the bed arms or legs, rotates the bed deck (typically about 90 degrees), and via the base rollers or castors, moves the bed to a desired location. After transport, the user rotates the bed deck to a position substantially planar with the floor, extends the legs or arms whereby said legs or arms support the bed (and possibly raise the bed transport and utility dolly supports), releases the bed attachments and removes the supports from each end of the bed. With the present art, bed transport which previously required two or more persons may be achieved with a single person. The present art provides bed transportation, especially within nursing care, assisted living, or hospital facilities, in a safer, easier, quicker, and more cost effective manner. Although the preferred embodiment is anticipated for height and angle adjustable beds, i.e. low type beds, the present invention in a modified form or utilization method may transport non adjustable beds provided a lifting mechanism is included in conjunction with the bed transport and utility dolly.

Accordingly, it is an object of the present invention to provide a bed transport and utility dolly having a pair of rolling supports which attach or engage with the foot and head portions of a bed and provide convenient transportation without the use of any other tools or dollies.

Another object of the present invention is to provide a bed transport and utility dolly which easily allows the attached bed to rotate or pivot, thereby minimizing doorway and hallway interference during bed transport.

A further object of the present invention is to provide a bed transport and utility dolly which quickly and easily attaches prior to bed transport and is quick and easily removed thereafter.

A yet further object of the present invention is to provide a bed transport and utility dolly which allows a single person to easily, quickly, and safely move a bed which typically would require two or more persons.

SUMMARY OF THE INVENTION

To accomplish the foregoing and other objects of this invention there is provided a bed transport and utility dolly having a frame with two or more base rollers or castors, a swing arm, and one or more handles for user interface and control. Each swing arm is attached with the frame via a support shaft which allows the swing arm to rotate relative to the frame. In a preferred embodiment, each swing arm also has two or more bed couplers which couple or attach or engage with the bed frame or other supportive bed structure. In a preferred embodiment, each of said couplers further have a quick release mechanism which provides a positive and secure attachment with the bed yet allows a quick and easy release after transport.

Conventional adjustable beds, including those known as low beds, typically comprise a bed frame having a bed deck thereupon and adjustable or retractable support arms or legs having rollers or casters at the end of said arms or legs. Said beds further have a head portion, a foot portion, a bottom side, and a top side. Typically mechanical, electrical, pneumatic, or hydraulic actuators are mounted below the bottom side, between the arms or legs and said frame, and provide the adjustable or retractable movement for said arms or legs. Said bed frame typically comprises, among other elements, two or more structural tubes attached with the frame and terminating near or at the head portion or foot portion.

In a preferred embodiment, the present art utilizes the aforesaid structural tubes as foot and head frame attachment structures or points for each of the bed transport and utility dolly supports. That is, the bed frame tubes are typically rectangular and hollow (alternative embodiments of said frame tubes may be of other cross sections including circular, elliptical, hexagonal, etc.) and easily allow insertion of an external interface or bed coupler. In a preferred embodiment, the bed couplers of the swing arms mate with the structural tubes and are secured with a quick release mechanism. Each quick release mechanism provides a quick, easy, and secure mating of the supports with the bed frame and also provides a quick and easy disassembly of the bed transport and utility dolly from the bed after transport. In a preferred embodiment said quick release mechanisms comprise commercially available snap buttons from suppliers such as Valley Tool and Die of North Royalton, Ohio, USA which mate with holes within said frame tubes.

In a preferred embodiment, each swing arm support shaft mates within a hole of each support frame. Preferably a bearing collar is attached onto said hole on a front side of said frame and said swing arm rotatably mates within said bearing. Also in a preferred embodiment, a fastener such as a cap screw, inserts through a centered fastener hole in the frame and holds the swing arm with said frame as an assembly. A preferred embodiment of the present invention further comprises a retainer which holds the swing arm substantially upright during bed transport or storage. The retainer is positioned between or around the swing arm and the frame.

The aforementioned pair of supports and associated components may be manufactured from a variety of materials which provide the structural strength necessary for bed transport. These include but are not limited to materials such as iron, steel, aluminum, titanium, and magnesium, (including alloys thereof) and plastics, composites, and various woods. The rollers or castors are typically of a hard or soft molded plastic or rubber material.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
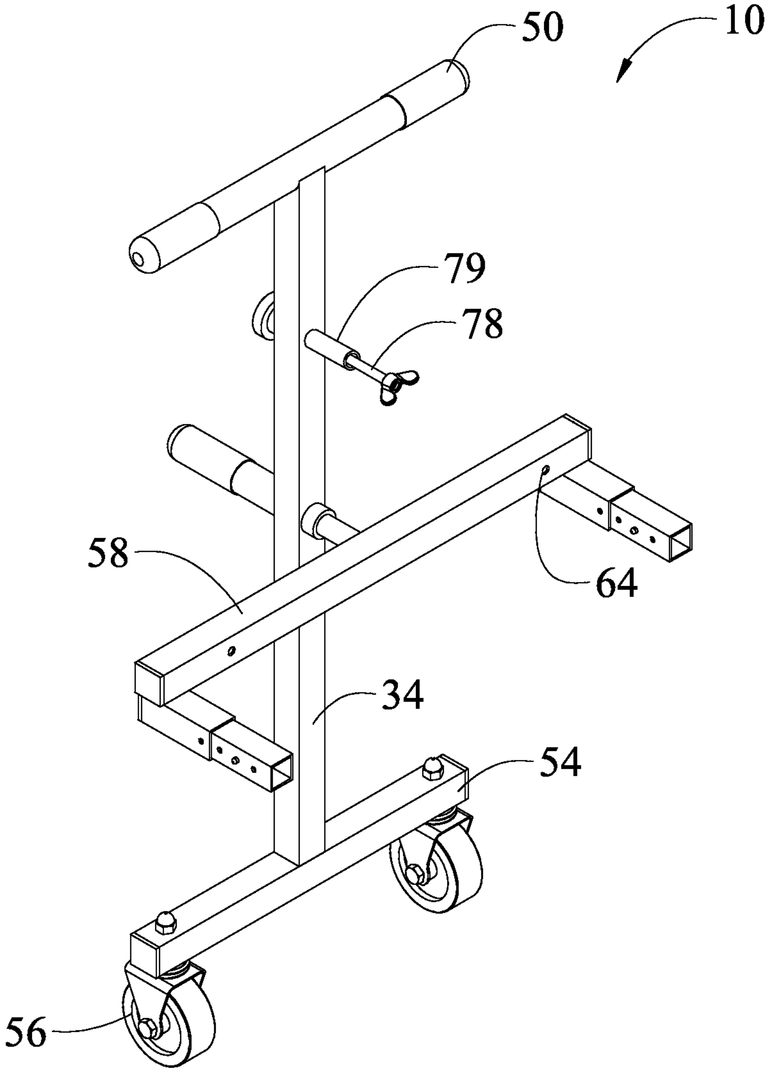
FIG. 1 is a front side perspective view of one of the supports of the bed transport and utility dolly.
Figure 2:
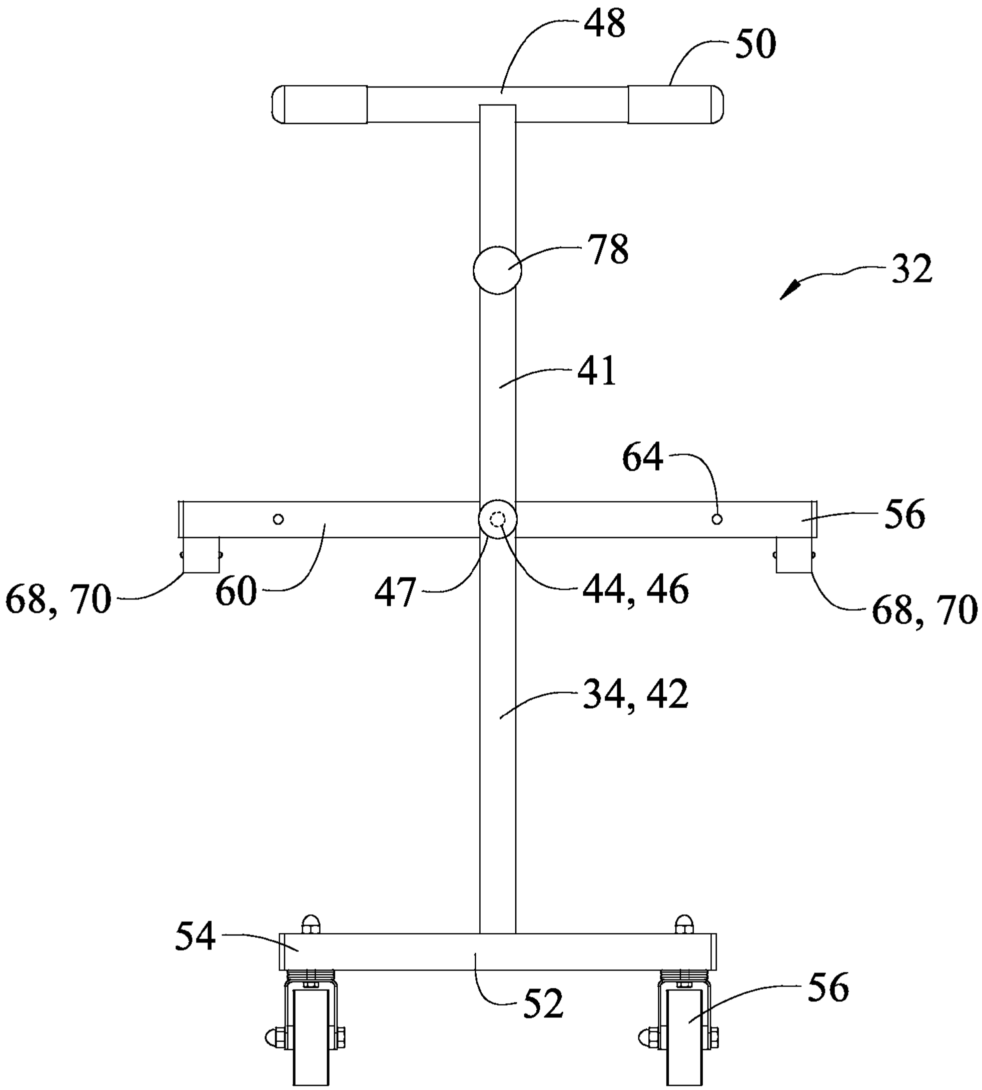
FIG. 2 is a back side plan view of one of the supports of the bed transport and utility dolly.
Figure 3:
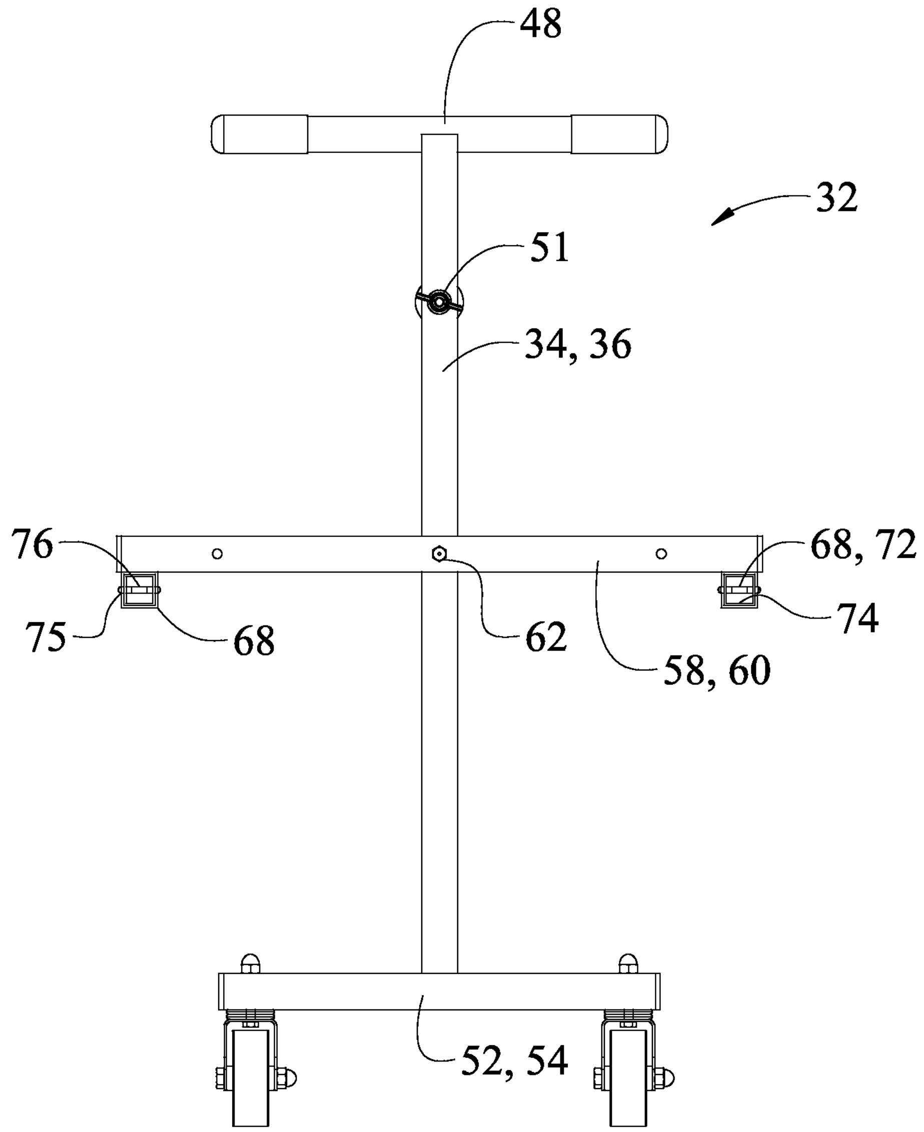
FIG. 3 is a front side plan view of one of the supports of the bed transport and utility dolly showing placement of an alternative embodiment center hole in the cross member for a retainer.
Figure 4:
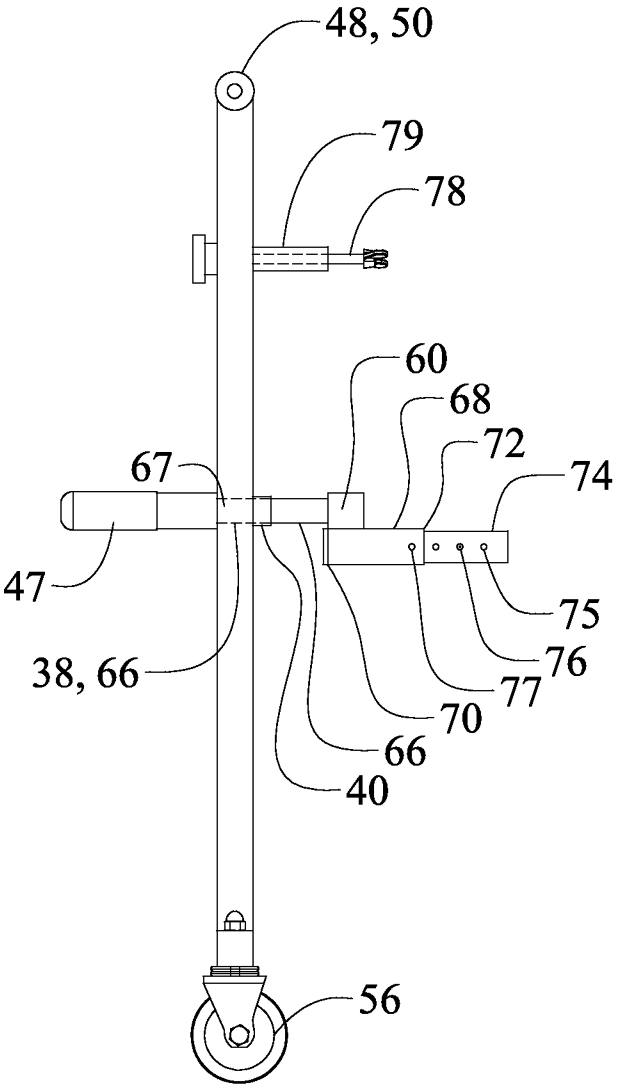
FIG. 4 is a right side plan view of one the supports of the bed transport and utility dolly.
Figure 5:
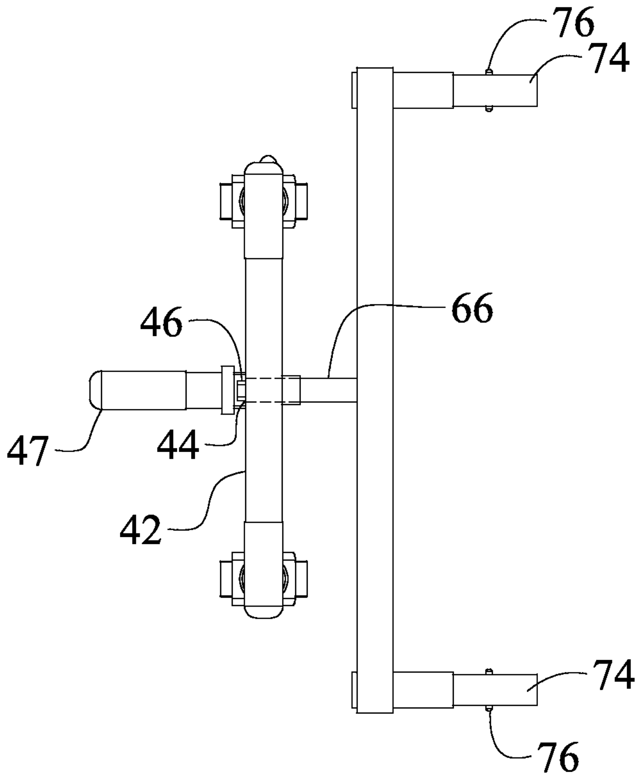
FIG. 5 is a top plan view of one of the supports of the bed transport and utility dolly showing the support shaft and fastener in phantom.
Figure 6:
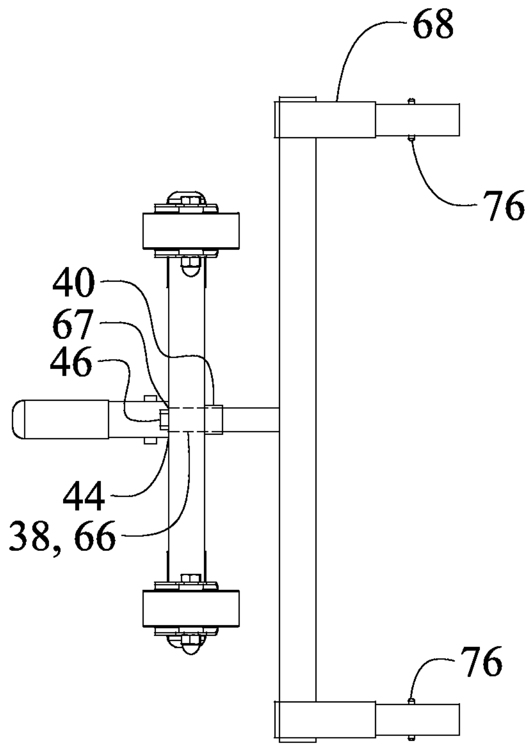
FIG. 6 is a bottom plan view of one of the supports of the bed transport and utility dolly.
Figure 7:
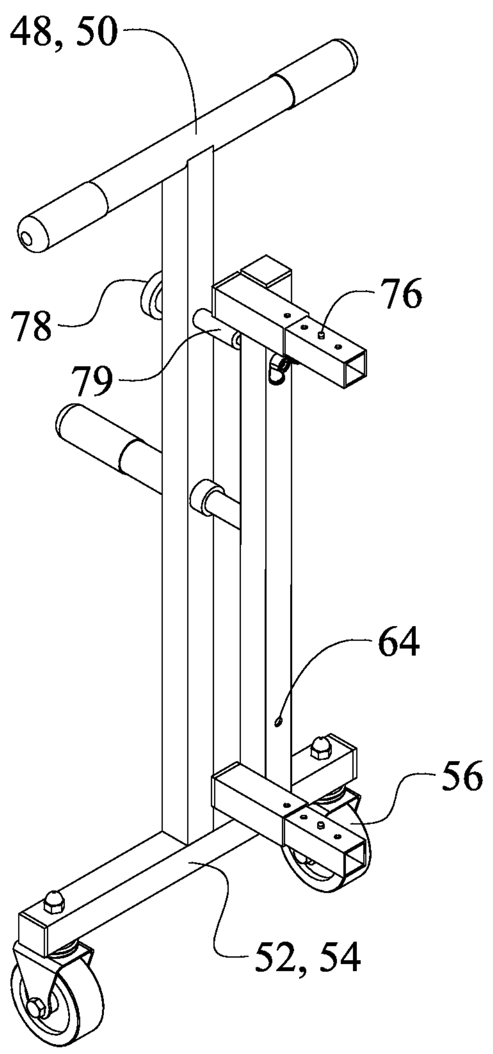
FIG. 7 is a front side perspective view of one the supports of the bed transport and utility dolly with the swing arm in a rotated position.
Figure 8:
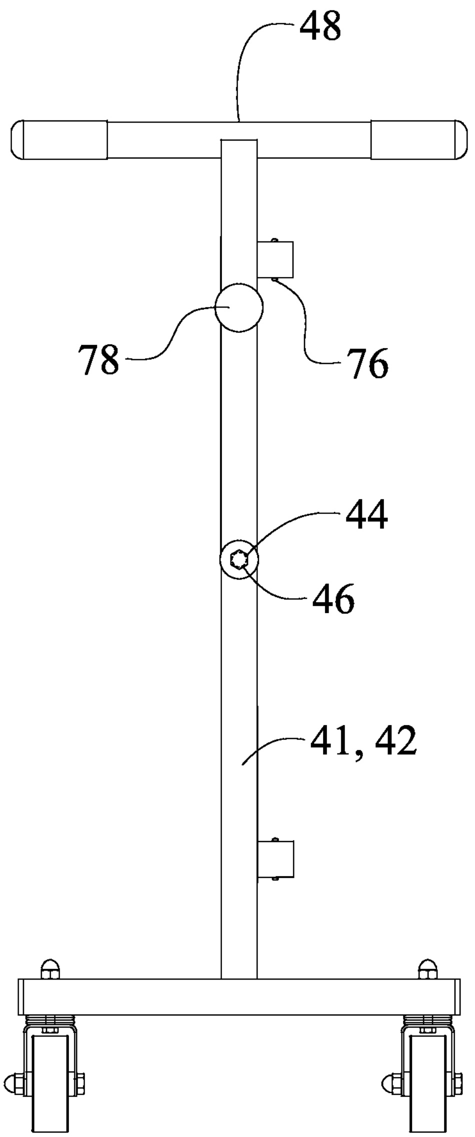
FIG. 8 is a back side plan view of one of the supports of the bed transport and utility dolly with the swing arm in a rotated position.
Figure 9:
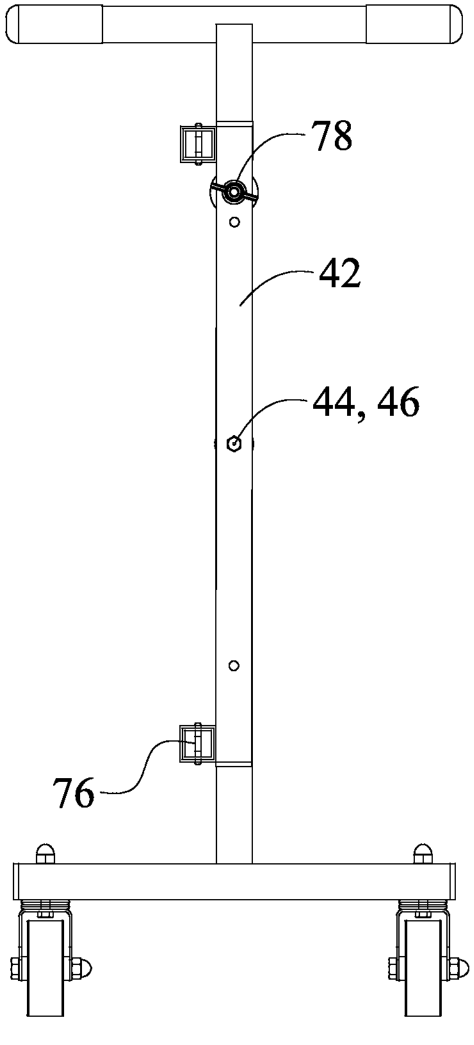
FIG. 9 is a front side plan view of one of the supports of the bed transport and utility dolly with the swing arm in a rotated position.
Figure 10:
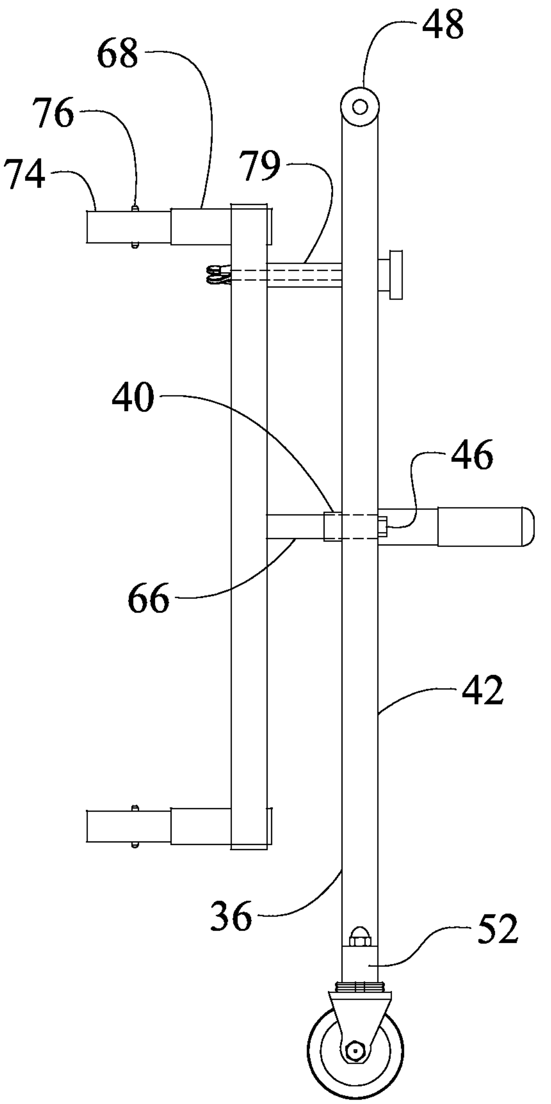
FIG. 10 is a left side plan view of one of the supports of the bed transport and utility dolly with the swing arm in a rotated position.
Figure 11:
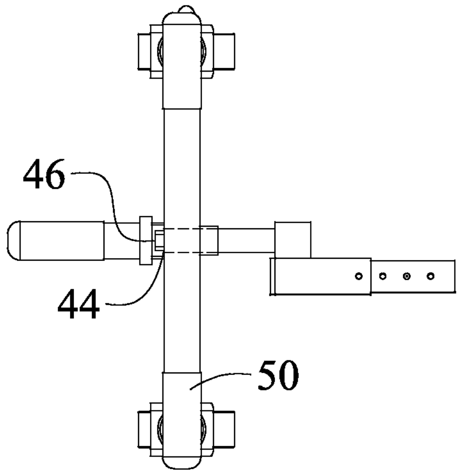
FIG. 11 is a top plan view of one of the supports of the bed transport and utility dolly with the swing arm in a rotated position.
Figure 12:
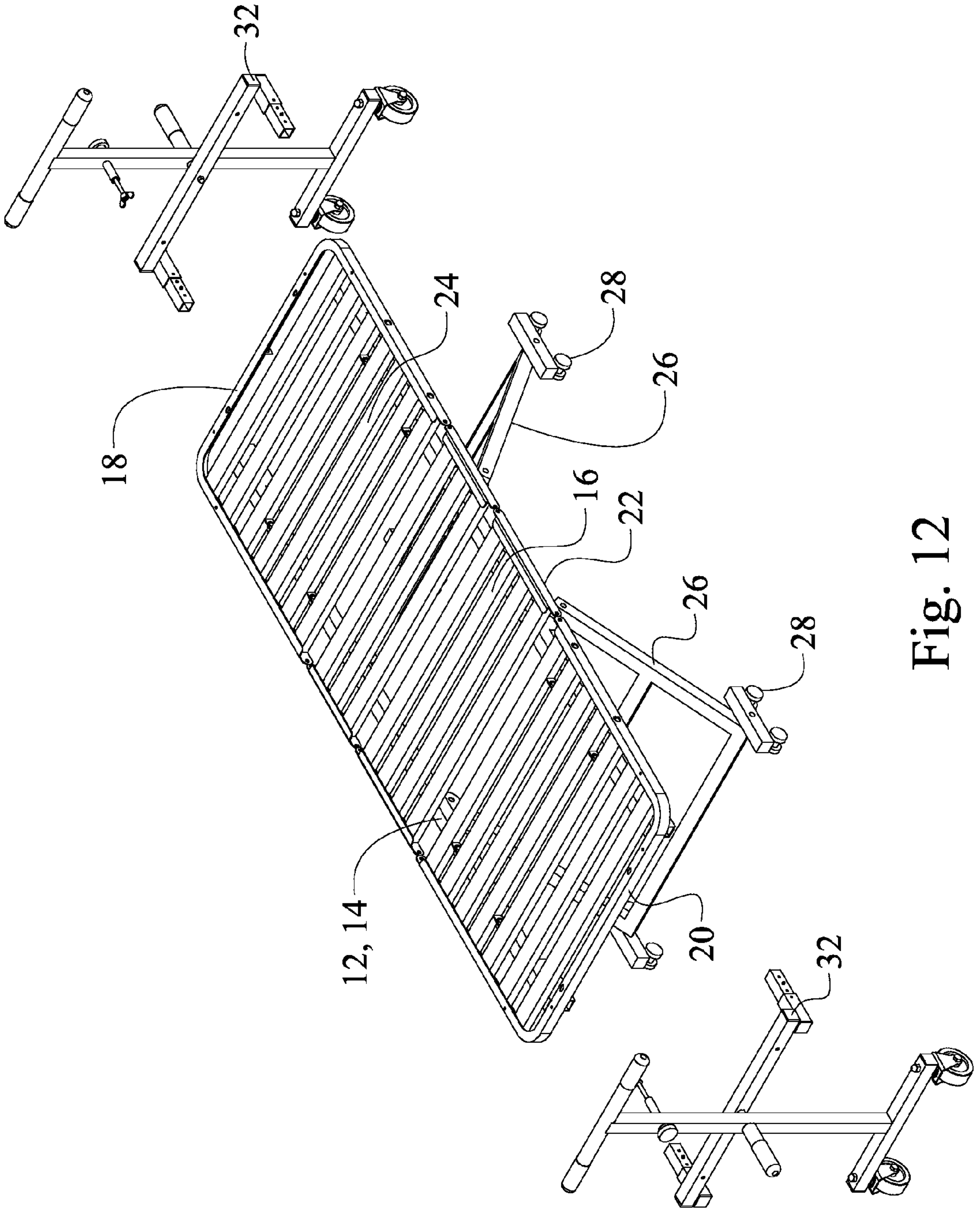
FIG. 12 is a perspective assembly view of the bed transport and utility dolly with an adjustable height bed.
Figure 13:
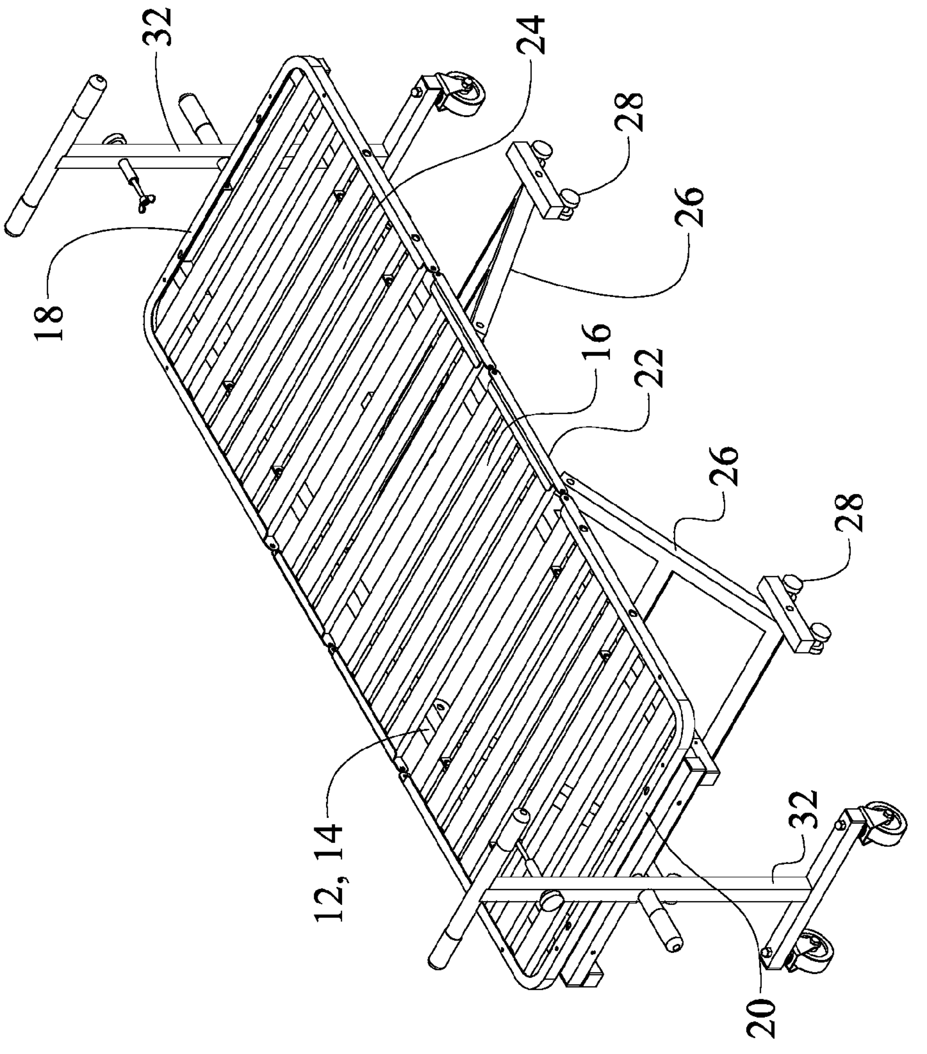
FIG. 13 is a perspective assembled view of the bed transport and utility dolly with an adjustable height bed with the bed legs or arms extended.
Figure 14:
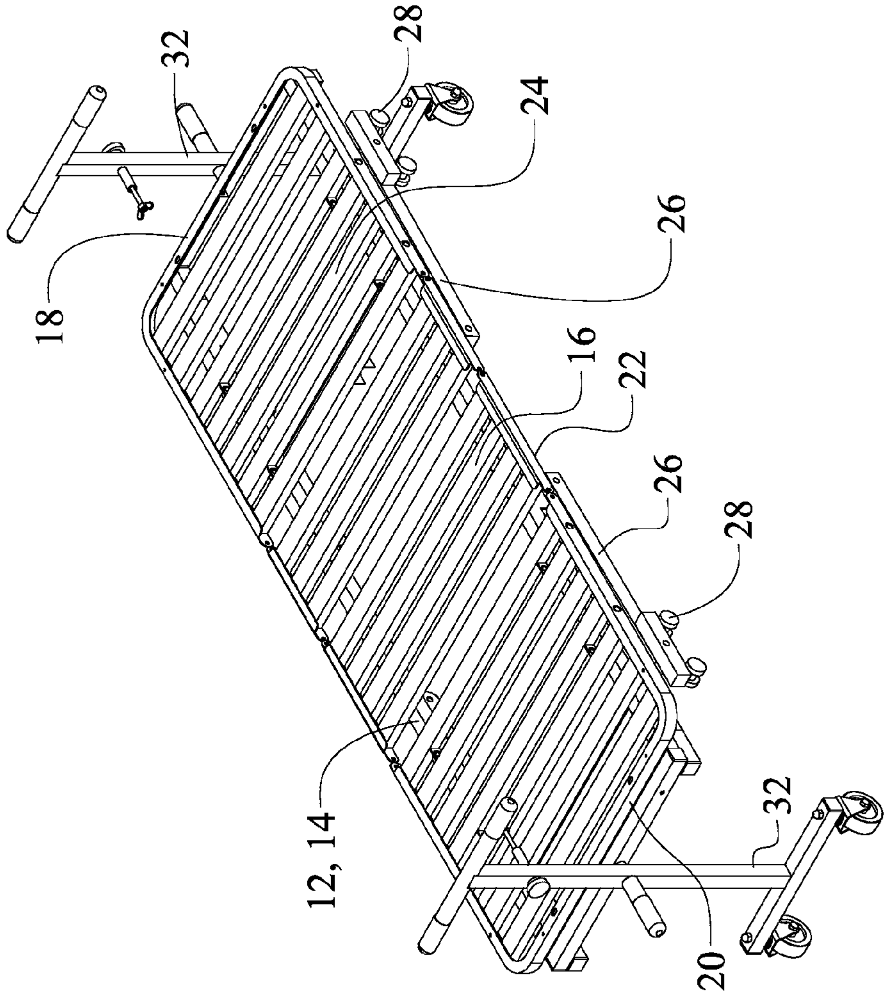
FIG. 14 is a perspective assembled view of the bed transport and utility dolly with an adjustable height bed with the bed legs or arms retracted.
Figure 15:
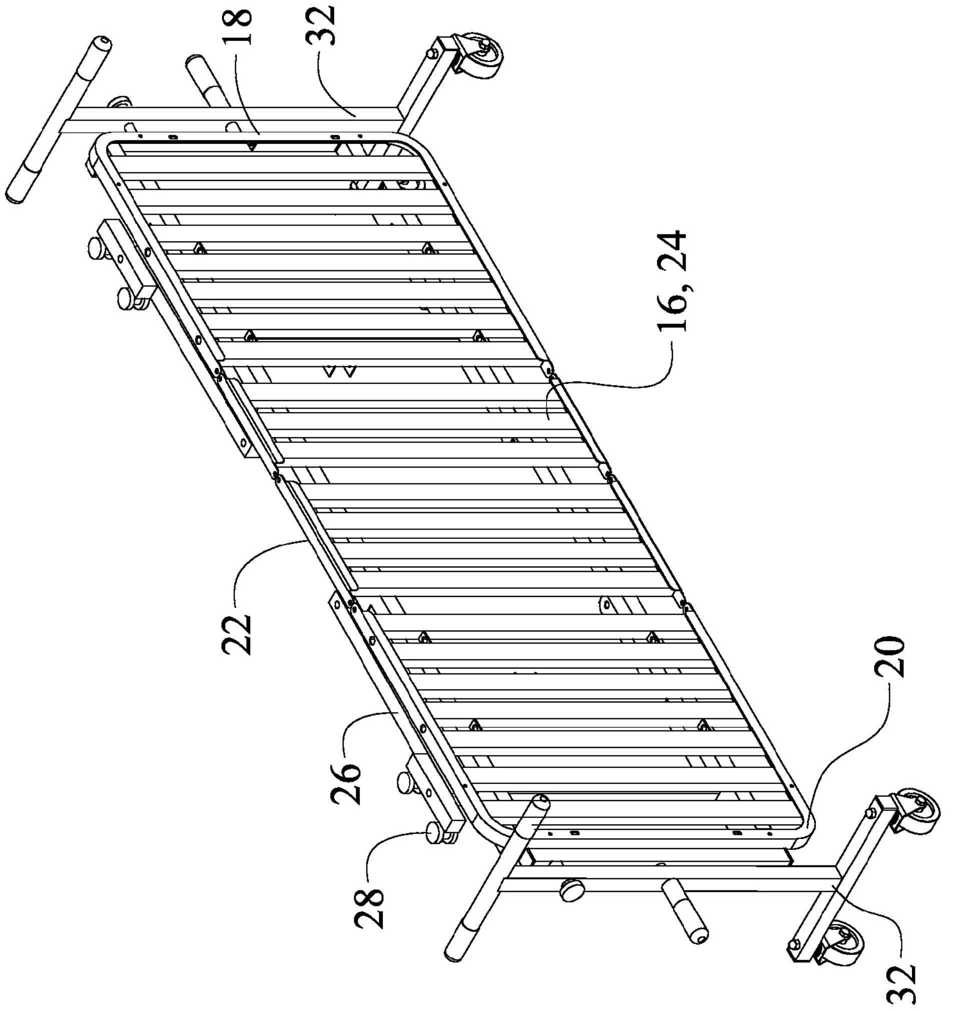
FIG. 15 is a perspective assembled view of the bed transport and utility dolly with an adjustable height bed with the bed legs or arms retracted and the bed rotated and retained for transport.
Figure 16:
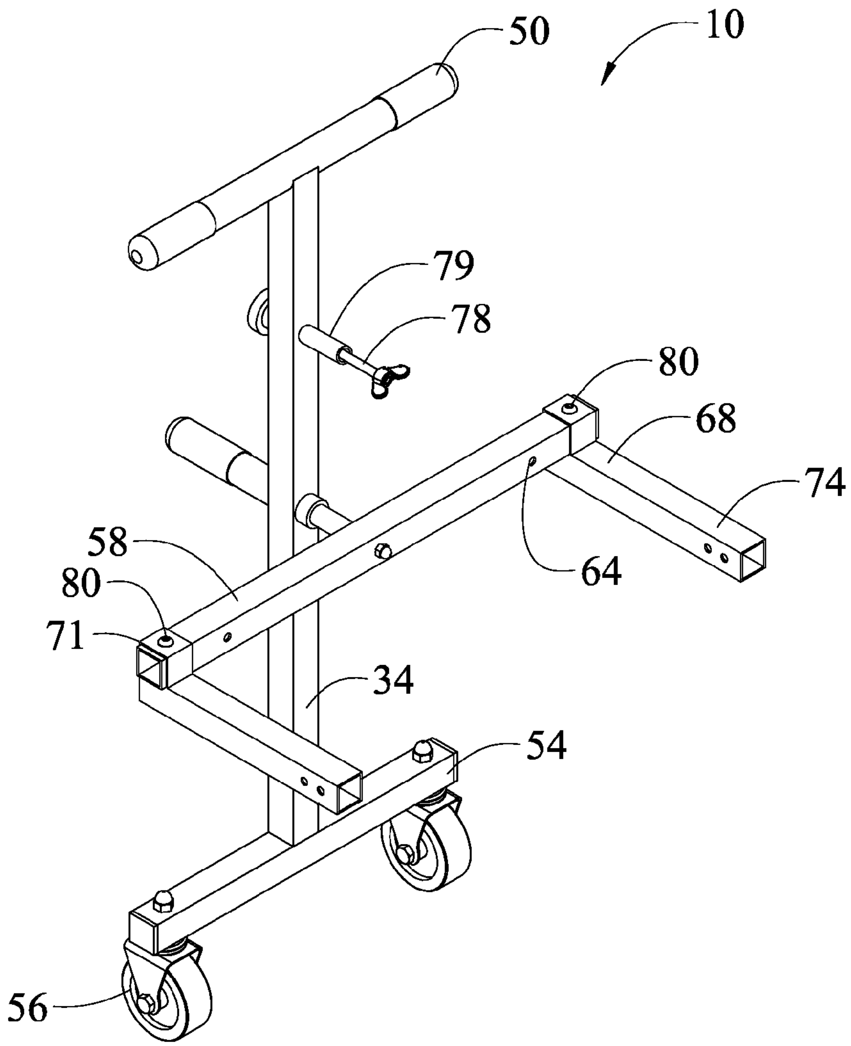
FIG. 16 is a front side perspective view of one of the supports of an alternative embodiment of the bed transport and utility dolly.
Figure 17:
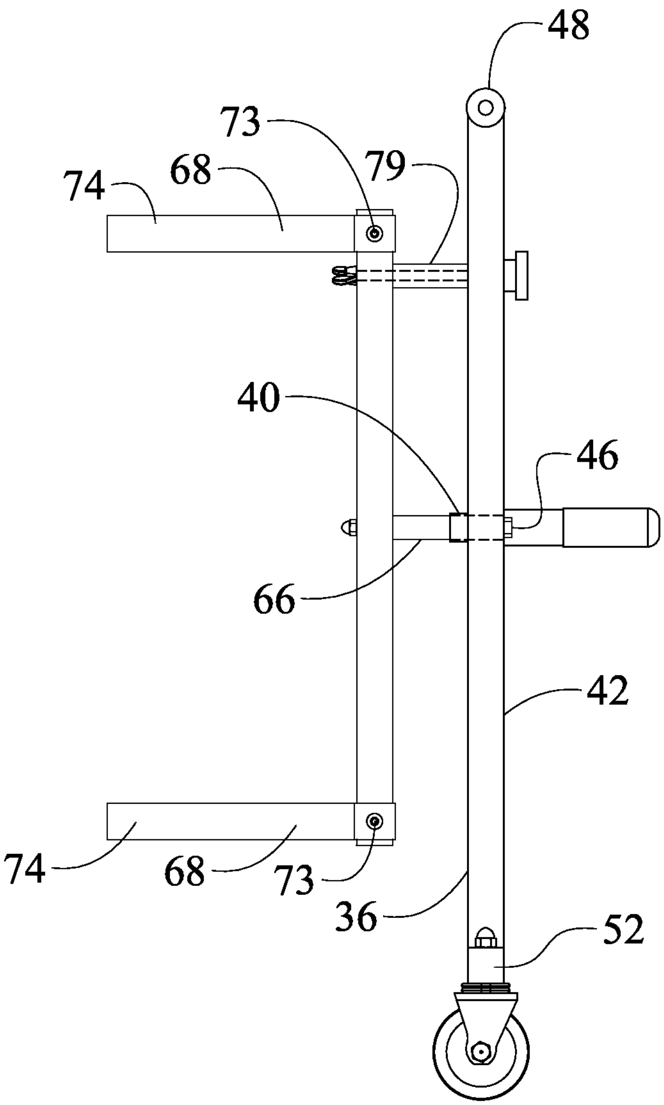
FIG. 17 is a left side plan view of one of the supports of an alternative embodiment of the bed transport and utility dolly with the swing arm in a rotated position.
Figure 18:
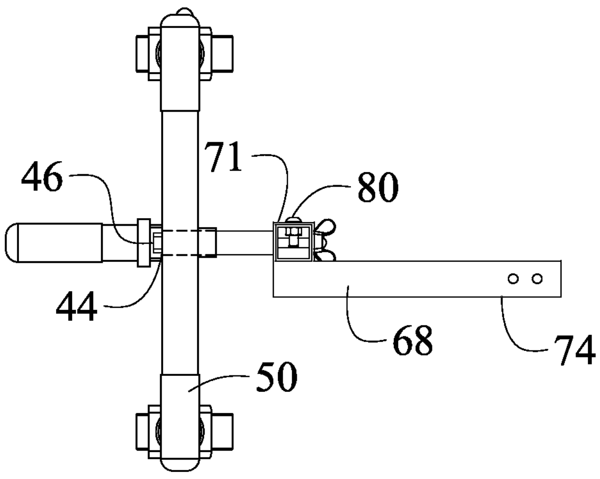
FIG. 18 is a top plan view of one of the supports of an alternative embodiment of the bed transport and utility dolly with the swing arm in a rotated position.

Referring now to the drawings, there is shown in FIGS. 1-15 a preferred embodiment bed transport and utility dolly 10 and FIGS. 16-18 an alternative embodiment, all comprising a pair of supports 32, each support constructed to work in unison when connected with a bed frame there between without the use of extra tools or dollies. FIG. 3 shows an alternative center hole 62 placement for assembly retention. In a preferred embodiment, each of said supports comprises a frame 34, a swing arm 58 pivotally or rotatably attached thereto, and one or more extending bed couplers 68 positioned to removably mate with a bed frame 12, especially a structural tube 14 portion of a bed. Although described in conjunction with extensions 74 in the preferred embodiment, said bed couplers 68 may take a plurality of forms in alternative embodiments, including but not limited to clamps, clips, arms, fasteners such as bolts, or any other mechanical element which is capable of connecting or attaching the bed frame 12 with the swing arm 58 and securing the frame 12 for transport with the dolly 10.

The support 32 frame 34 comprises a front side 36 having a bearing hole 38 within an upright support 41 and a bearing collar 40 which accepts a support shaft 66 from said swing arm 58. The frame 34 also comprises a back side 42 having a fastener hole 44 in said upright 41 through which a fastener 46 such as a bolt or pin is inserted through said fastener hole 44 and into said support shaft 66. Said fastener 46 pivotally holds or attaches the frame 34 and swing arm 58 together as an assembly. That is, the frame 34 pivotally supports the swing arm 58 via the pivotal mating of the support shaft 66 with the bearing hole 38, and bearing collar 40 if attached. In a preferred embodiment, said fastener hole 44 has a smaller diameter than the bearing hole 38 thereby prohibiting the support shaft 66 from extending through the frame 34 upright 41. The preferred embodiment further attaches a stabilizer handle 47 onto said back side 42 of said frame 34 which allows the user to more easily stabilize the dolly 10 during installation, use, and removal.

The frame 34 further comprises a top 48 having one or more attached handles 50 near said top and a bottom 52 having an attached base 54 onto which two or more rollers or castors 56 are mounted. Said handle 50 is preferable a "T" shaped tubular handle with soft-grips which is attached at or near said top 48 approximately perpendicular with said upright support 41 and parallel with said base 54. Alternative embodiments may simply utilize an innate attribute of said frame 34 as a handle with or without grips. Said base 54 is a cross support member attached approximately perpendicular with said upright support 41 and serves as a mounting element for said rollers or castors 56. Said rollers or castors 56 are staple items which may be attached via a plurality of methods including but not limited to bolts, clamps, pins, welds, or adhesives. In the preferred embodiment, when assembled, the handle(s) 50 and base 54, upright 41, and support shaft 66 are approximately spatially related in an orthogonal manner.

As aforesaid, the swing arm 58 pivotally attaches or mates with the support frame 34, interfaces or removably connects with the bed frame 12, and transfers the bed load to the support frame 34, thereby allowing rotation and transport of the bed in an easy, convenient, and safe manner. In a preferred embodiment, the swing arm 58 comprises a cross member 60 having an attached support shaft 66 which mates with said bearing collar 40 and bearing hole 38 and seats with a wall of said upright 41 opposite said bearing hole 38. An end of said support shaft 66 in a preferred embodiment has a threaded end 67 which accepts a fastener 46 through the fastener hole 44 in order to retain the swing arm 58 with the frame 34 as an assembly. For an alternative embodiment, the swing arm 58 comprises a cross member 60 which has a center hole 62 positioned approximately centrally through which a fastener 46 such as a bolt is placed to secure the swing arm 58 to the frame 34. As understood within the applicable arts, further alternative embodiments may utilize a plurality of support shaft 66 forms including embodiments which simply reverse the attachment point of the shaft 66. That is, the shaft 66 may be attached to said frame 34 and pivotally mated within a bearing hole 38 within said swing arm 58 or simply utilize a support shaft 66 in the form of a bolt, pin, tube, or rod inserted through the frame 34 and swing arm 58.

For the preferred embodiment, the swing arm also has a retainer hole 64 positioned off center, preferably near an end of said cross member 60, which when assembled aligns with a frame retainer hole 51 within said frame 34 and allows a retainer 78 to be placed there through and hold the bed in a rotated position. Said retainer 78 may take any mechanical form positioned between said swing arm 58 and said frame 34 whereby said swing arm 58 and frame 34 are substantially locked, prohibited from relative rotation, and capable of holding said swing arm 58 during transport of the bed. In a preferred embodiment, said retainer 78 is a bolt or pin placed through said holes 51, 64 and in a preferred embodiment has a surrounding sleeve 79 or bushing between said swing arm 58 and said frame 34. Said sleeve 79 serves to further secure the swing arm 58 with said frame 34 during transport. That is, the sleeve 79 abuts against the swing arm 58 and said frame 34 and helps to reduce the load upon the support shaft 66. Alternative embodiments may use a plurality of mechanical fasteners, clamps, adhesives, retainers, or other means to lock the swing arm 58 and frame 34 together.

Said cross member 60 further has one or more bed couplers 68 attached thereto. In a preferred embodiment, two bed couplers 68 are separated and attached near or at the ends of said cross member 60. If sufficiently wide and having sufficient torsional strength, a single bed coupler 68 may be utilized in an alternative embodiment and positioned at any location upon said cross member 60. Each of said bed couplers 68 are capable of removably attaching with a bed near or at the foot portion 20 or head portion 18. That is, each coupler 68 preferably attaches to the bed frame 12 but may attach to other structurally supportive portions of the bed. Each bed coupler 68 is preferably tubular in structure and has a proximal 70 and distal 72 end. In a preferred embodiment, said proximal end 70 is attached with or near an end of said cross member 60 via welding although other fastening methods such as pins, bolts, clamps, or other fastening means such as toggle locking may be utilized.

In a preferred embodiment, an extension 74 having a cross sectional width and height less than or equal to the inside cross section width and height of said bed coupler 68 fits within said bed coupler 68 and is secured or attached via pins or bolts inserted through extension holes 77 within said bed couplers 68 and said extensions 74. Alternative embodiments may utilize bed couplers 68 which integrally include the extension 74. That is, each bed coupler 68 is an extended single tube. In the preferred embodiment, the extension 74 extends from said coupler 68 and has a cross sectional shape which is capable of removably fitting with a structural tube 14 of a bed frame 12.

Also in the preferred embodiment, one or more quick release mechanisms 76 are fitted with said extensions 74 and provide removable securing of said swing arm 58 with said bed frame 12. In a preferred embodiment, the quick release mechanisms 76 are placed distally from the cross member 60 and positioned to retain the bed when the bed couplers 68 are removably attached with the bed. In the preferred embodiment said quick release mechanisms 76 are spring biased snap buttons (such as manufactured by Valley Tool and Die of North Royalton, Ohio, USA) fitted with and positioned internally to said extension 74 and extending or protruding through one or more quick release holes 75 within said extension 74. That is, since the extension 74 preferably comprises square tubing in a preferred embodiment, said snap buttons are inserted into said extension 74 and via spring force extend a button externally from the tubing through the quick release holes 75. Said button mates with one or more holes within the bed frame 12 structural tubes 14 when the dolly 10 is assembled with a bed. Alternative embodiment quick release mechanisms 76 may comprise a plurality of forms including but not limited to bolts, pins, clamps, hook and loop fasteners, clips, or frictional fits and may attach directly with said coupler 68 with or without use of said extension 74.

For the alternative embodiment of FIGS. 16-18, the bed coupler 68 comprises a socket or opening 71 at or near said proximal end 70 which fits around said cross member 60. The socket or opening 71 is of a tubular or hollow form and is attached with said bed coupler 68 preferably via welding but may be attached via a plurality of methods including but not limited to bolts, screws, rivets, or adhesives. Preferably, the socket or opening 71 is of a non-circular cross section which mates with the cross member 60 cross section and inhibits rotation of the bed coupler 68 relative to the cross member 60, i.e. a square tubing. A socket hole 73 within said socket or opening 71 allows a bolt, screw, bolt and nut, rivet, or other fastener 80 to be placed through said socket hole 73 and into said cross member 60 whereby said bed coupler 68 and cross member 60 are held together in a position which allows the bed coupler 68 to extend substantially perpendicular relative to the axis of said cross member 60.

For the alternative embodiment, the extension 74 and said bed coupler 68 are the same member. That is, a single piece of tubing, stock, or other material serves as both the extension 74 and said bed coupler 68. The remaining quick release mechanism 76 and quick release holes 75 are positioned and function as with the preferred embodiment.

In the preferred embodiment, the support shaft 66 is attached with said cross member 60 of said swing arm 58 and extends substantially perpendicular thereto and proximately or opposite said extensions 74 of said bed couplers 68. As aforesaid, the support shaft 66 is positioned approximately central to said swing arm 58 with alternative embodiments utilizing an off center position. Preferably said support shaft 66 is of a circular or tubular cross section and attached with said swing arm 58 via welding, although any mechanical fastening or retaining means may be utilized, including but not limited to press fits, welds, bolts, or pins. For the preferred embodiment, the support shaft 66 has a threaded hole 67 in an end and is inserted into and mates with said bearing hole 38 and bearing collar 40 and is pivotally supported thereby. The fastener 46 mates with said threaded hole 67 through said frame 34 backside 42 and secures the assembly. Alternative embodiments may simply insert a bolt or pin through a hollow support shaft 66 and terminate the bolt or pin with a nut or retainer external to the frame 34 or swing arm 58 assembly. Although the preferred embodiment is described with the support shaft 66 attached with the swing arm 58, alternative embodiments as an equivalent, may utilize a support shaft 66 attached with said frame 34 and a bearing hole 38 within said cross member 60 with a fastener 46 inserted partially or fully through said swing arm 58.

Integral to the design, operation, function, and use of the present art dolly 10 is the bed with which utilization is anticipated. A height or angle adjustable bed comprises a bed frame 12 having a head portion 18, a foot portion 20, a top side 24, a bottom side 22, and a deck 16 supported upon said top side 24 of said frame 12. Height adjustable, raising, lowering, or pivoting support arms 26 or legs, often with rollers or castors 28, extend from said bottom side 22 and provide height and angle adjustment via one or more linear actuators. (A more detailed description of actuators as related hereto may be found in U.S. Pat. No. 6,405,393 issued to Megown on Jun. 18, 2002 and entitled Height and Angle Adjustable Bed Having a Rolling Base, specifically callout #36) The afore described bed frame 12 typically comprises two or more substantially parallel supports which transition from the head 18 to the foot 20 of the bed and have two or more structural tubes 14 attached at or near the head 18 and foot 20. Conventional beds as described herein also have one or more holes in the structural tube 14 near or at the head 18 or foot 20 portions. Said construction conveniently allows the present art dolly 10 coupler 68 extensions 74 to mate therein and secure therewith via the quick release mechanism 76 snap buttons.

Alternative embodiments of the present dolly 10 may utilize bed couplers 68 which removably attach directly to the bed frame 12 or any other portion of the bed without insertion. That is, clamps, arms, bolts, or other couplers may extend from the pivot arm and secure any structurally sound bed portion near or at the foot 20 or head 18 portion. Obviously any bed portion secured therewith must be able to support the mass of the entire bed.

As described within the preferred embodiment, the present art utilizes substantially square tubing for the structure frame 34, upright 41, base 54, swing arm 58, cross member 60, coupler 68, and extension 74 components with various width and height cross sections which accommodate the fitting and placement described. Alternative embodiments may utilize solid or hollow stock materials of a plurality of cross sections, including but not limited to circular, elliptical, rectangular, and triangular.

Utilization and operation of the bed transport and utility dolly 10, by design, is quick, easy, convenient, safe, and unlike prior methods, may be performed by a single person without the aid of extra tools or dollies. Operation proceeds with the user positioning the height of the bed frame 12 substantially commensurate with the height of the bed couplers 68 when the cross member 60 is substantially perpendicular to the upright 41. That is, the user raises or lowers the support arms or legs 26 of the bed and rotates said swing arm 58 to obtain an alignment of the bed couplers 68 with the head 18 and foot 20 portions of the bed. The bed coupler 68 is attached at the head portion 18 for a first support 32 and at the foot portion 20 for a second support 32. For the preferred embodiment, the extension 74 is inserted into the bed frame 12 structural tube(s) 14 and removably secured via one or more quick release mechanisms, i.e. snap buttons. The support arms 26 or legs are then raised or retracted and the bed is supported solely by the dolly 10. The bed is then rotated approximately 90 degrees and secured in said position by a retainer 78. That is the swing arms 58 are rotated relative to said frame 34. In the preferred embodiment, said retainer 78 comprises a bolt or pin placed between and/or through the cross member 60 retainer hole 64 and the frame 34 retainer hole 51 with a sleeve 79 there between. Other retainer methods such as cords, clamps, or clips may be utilized for retention.

After rotation, the bed represents a taller and thinner structure which is easily moved on said rollers or castors 56. The user(s) simply pushes or pulls the bed with the attached dolly 10, especially through doors and crowded hallways, to a destination or desired location. Upon arrival, the retainers 78 are removed and the bed is rotated into a conventional position, i.e. an approximately equivalent position before rotation and pushing or pulling. The support arms 26 or legs are then extended whereby the support arms 26 support the bed and the dolly 10 is not required for support. The quick release mechanisms 76 are then released and the bed couplers 68 are removed. After separation from the bed, each dolly 10 support 32 is available for transport of another bed. The present art 10 substantially minimizes the task of bed movement relative to the prior art.

From the foregoing description, those skilled in the art will appreciate that all objects of the present invention are realized. A bed transport and utility dolly comprising a pair of supports is shown and described. The apparatus and method of use provides quick, easy, convenient, and safe bed transport by a single person. The apparatus and method of use is especially useful for health and nursing care facilities and further helps to minimize the operational expenses thereof.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A bed transport and utility dolly in combination with a bed comprising:

a low type bed having two or more structural tubes attached at or near a head and a foot of said bed; and said bed having two or more raising and lowering support arms extending from a bottom side and capable of providing height adjustment of said bed; and two or more supports, each support having a frame and a swing arm; and said frame having a front side, a back side, a top, and a bottom; and a base attached with said frame near said bottom, said base having two or more rollers or castors; and said swing arm having a cross member pivotally attached with said frame front side and one or more bed couplers, each having a proximal and distal end, said proximal end attached with said cross member; and said bed couplers further comprising one or more extensions, each having a cross section capable of removably fitting with said structural tube of said bed; and a quick release mechanism positioned with one or more of said extensions and capable of removably securing said swing arm with said bed frame; and one or more handles attached with said frame near said top; and a support shaft between said frame and said swing arm through which said cross member is pivotally attached with said frame; and each of said bed couplers having a cross section capable of removably fitting within said structural tubes of said bed near or at said head or said foot of said bed whereby after attachment said support arms may be raised and said bed may be rotated between said supports and transported on said rollers thereby easily fitting through doors and safely navigating hallways.

2. The bed transport and utility dolly as set forth in claim 1 further comprising:

a bearing hole in said front side of said frame into which said support shaft mates and is pivotally supported by said frame; and a fastener hole within said back side of said frame through which a fastener fits and retains said support shaft within said bearing hole.

3. The bed transport and utility dolly as set forth in claim 2 further comprising:

a bearing collar attached with said front side of said frame and through which said support shaft is further supported.

4. The bed transport and utility dolly as set forth in claim 1, said quick release mechanism further comprising:

one or more snap buttons fitted within said extension and protruding through one or more quick release holes within said extension; and said snap buttons capable of mating with one or more holes within said structural tube.

5. The bed transport and utility dolly as set forth in claim 1 further comprising:

one or more retainers positioned between said swing arm and said frame and capable of retaining said swing arm during transport of said bed.

6. An bed transport and utility dolly as set forth in claim 5, said retainer comprising:

a pin or bolt positioned through and between a retainer hole within said swing arm and a frame retainer hole within said frame.

7. The bed transport and utility dolly as set forth in claim 1 further comprising:

said support shaft attached with said frame; and a bearing hole in said cross member into which said support shaft mates and is pivotally supported by said frame.

8. The bed transport and utility dolly as set forth in claim 7 further comprising:

one or more retainers positioned between said swing arm and said frame and capable of holding said swing arm during transport of said bed.

9. An bed transport and utility dolly as set forth in claim 8, said retainer comprising:

a pin or bolt positioned through and between a retainer hole within said swing arm and a frame retainer hole within said frame.

* * * * *